(12) United States Patent
Perlmutter et al.

(10) Patent No.: US 10,157,013 B2
(45) Date of Patent: Dec. 18, 2018

(54) EFFICIENT READOUT FROM MEMORY CELLS USING DATA COMPRESSION

(71) Applicant: Apple Inc., Cupertino, CA (US)

(72) Inventors: Uri Perlmutter, Ra'anana (IL); Dotan Sokolov, Ra'anana (IL); Ofir Shalvi, Ra'anana (IL); Oren Golov, Hod-HaSharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/602,444

(22) Filed: May 23, 2017

(65) Prior Publication Data

US 2017/0269866 A1    Sep. 21, 2017

Related U.S. Application Data

(63) Continuation of application No. 14/987,324, filed on Jan. 4, 2016, now Pat. No. 9,671,972, which is a continuation of application No. 13/526,859, filed on Jun. 19, 2012, now Pat. No. 9,229,861, which is a continuation of application No. 12/397,368, filed on Mar. 4, 2009, now Pat. No. 8,230,300.

(60) Provisional application No. 61/034,511, filed on Mar. 7, 2008, provisional application No. 61/052,276, filed on May 12, 2008, provisional application No. 61/053,031, filed on May 14, 2008.

(51) Int. Cl.
*H03M 13/11* (2006.01)
*G06F 3/06* (2006.01)
*G06F 11/10* (2006.01)
*G06F 12/08* (2016.01)

(52) U.S. Cl.
CPC .......... *G06F 3/0638* (2013.01); *G06F 3/0604* (2013.01); *G06F 3/0679* (2013.01); *G06F 11/1008* (2013.01); *G06F 12/08* (2013.01)

(58) Field of Classification Search
CPC .................................................... H04L 1/0045
USPC ................................. 714/746, 763, 764, 779
See application file for complete search history.

(56) References Cited

U.S. PATENT DOCUMENTS

| | | | |
|---|---|---|---|
| 7,096,406 B2 | 8/2006 | Kanazawa et al. | |
| 8,239,747 B2* | 8/2012 | Cho | G06F 11/1072 714/799 |
| 8,429,493 B2* | 4/2013 | Sokolov | G06F 11/1072 713/187 |
| 2008/0086631 A1 | 4/2008 | Chow | |
| 2015/0205664 A1* | 7/2015 | Janik | G06F 11/1012 714/764 |
| 2016/0117130 A1* | 4/2016 | Perlmutter | G06F 11/1008 711/154 |

* cited by examiner

*Primary Examiner* — Fritz Alphonse
(74) *Attorney, Agent, or Firm* — Meyertons, Hood, Kivlin, Kowert & Goetzel, P.C.

(57) ABSTRACT

A method for data storage includes storing data in a group of analog memory cells by writing respective input storage values to the memory cells in the group. After storing the data, respective output storage values are read from the analog memory cells in the group. Respective confidence levels of the output storage values are estimated, and the confidence levels are compressed. The output storage values and the compressed confidence levels are transferred from the memory cells over an interface to a memory controller.

20 Claims, 3 Drawing Sheets

EFFICIENT READOUT FROM MEMORY CELLS USING DATA COMPRESSION

CROSS-REFERENCE TO RELATED APPLICATIONS

This application is a continuation of U.S. patent application Ser. No. 14/987,324, filed Jan. 4, 2016, which is a continuation of U.S. patent application Ser. No. 13/526,859, filed Jun. 19, 2012, issued on Jan. 5, 2016, as U.S. Pat. No. 9,229,861, which is a continuation of U.S. patent application Ser. No. 12/397,368, filed Mar. 4, 2009, issued on Jul. 24, 2012, as U.S. Pat. No. 8,230,300, which claims the benefit of U.S. Provisional Patent Application 61/034,511, filed Mar. 7, 2008, U.S. Provisional Patent Application 61/052,276, filed May 12, 2008, and U.S. Provisional Patent Application 61/053,031, filed May 14, 2008. The disclosures of all these related applications are incorporated herein by reference.

TECHNICAL FIELD

Embodiments described herein relate generally to memory devices, and particularly to methods and systems for reading data from memory cells.

BACKGROUND

Several types of memory devices, such as Flash memories, use arrays of analog memory cells for storing data. Each analog memory cell holds a certain level of a given physical quantity such as an electrical charge or voltage, which represents the data stored in the cell. The levels of this physical quantity are also referred to as storage values or analog values. In Flash memories, for example, each analog memory cell holds a certain amount of electrical charge. The range of possible analog values is typically divided into regions, each region corresponding to a programming state that represents one or more data bit values. Data is written to an analog memory cell by writing a nominal analog value that corresponds to the desired bit or bits.

Some memory devices, which are commonly referred to as Single-Level Cell (SLC) devices, store a single bit of information in each memory cell, i.e., each memory cell can be programmed to assume two possible memory states. Higher-density devices, often referred to as Multi-Level Cell (MLC) devices, store two or more bits per memory cell, i.e., can be programmed to assume more than two possible memory states.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory—PCM) cells. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

Data is sometimes read from memory cells using quality measures. For example, U.S. Pat. No. 6,751,766, whose disclosure is incorporated herein by reference, describes a memory system. The quality of data stored in the memory system is assessed by different methods, and the memory system is operated according to the assessed quality. The data quality can be assessed during read operations. Subsequent use of an Error Correction Code (ECC) can utilize the quality indications to detect and reconstruct the data with improved effectiveness. Alternatively, a statistics of data quality can be constructed and digital data values can be associated in a modified manner to prevent data corruption. In both cases, corrective actions can be implemented specifically on the poor quality data, according to suitably chosen schedules, and with improved effectiveness because of the knowledge provided by the quality indications.

SUMMARY OF THE EMBODIMENTS

An embodiment provides a method for data storage, including:

storing data in a group of analog memory cells by writing respective input storage values to the memory cells in the group;

after storing the data, reading respective output storage values from the analog memory cells in the group;

estimating respective confidence levels of the output storage values;

compressing the confidence levels; and transferring the output storage values and the compressed confidence levels from the memory cells over an interface to a memory controller.

In some embodiments, the method further includes decompressing the transferred output storage values at the memory controller, and reconstructing the data responsively to the output storage values and the decompressed confidence levels. In a disclosed embodiment, storing the data includes encoding the data with an Error Correction Code (ECC), and reconstructing the data includes decoding the ECC responsively to the decompressed confidence levels. Decoding the ECC may include computing respective ECC metrics of the output storage values responsively to the confidence levels, and decoding the ECC responsively to the ECC metrics.

In an embodiment, the method includes refining at least some of the confidence levels, updating the ECC metrics based on the refined confidence levels and re-decoding the ECC responsively to the updated ECC metrics. Refining the confidence levels and updating the ECC metrics may include, at a first time, refining the confidence levels and updating the ECC metrics only responsively to a failure in decoding the ECC, and at a second time subsequent to the first time, refining the confidence levels and updating the ECC metrics before initially attempting to decode the ECC.

In another embodiment, refining the confidence levels includes refining the confidence levels of only a subset of the output storage values that were previously identified as having a low confidence level. In yet another embodiment, computing the ECC metrics includes marking some of the output storage values as erasures. In still another embodiment, reading the output storage values includes applying one or more first read thresholds to the analog memory cells in the group, and estimating the confidence levels includes re-reading the analog memory cells in the group using one or more second read thresholds, different from the first read thresholds.

In an embodiment, storing the data includes programming each of the analog memory cells in the group to a respective programming state selected from two or more programming states, and re-reading the analog memory cells includes identifying the output storage values contained in a boundary region separating two of the programming states. In another embodiment, reading the output storage values includes re-reading the output storage values multiple times to produce respective multiple sets of read results, and estimating the confidence levels includes determining differences between the respective read results in the multiple sets. Re-reading the output storage values may include producing a first set of the read results using a first read operation having a first accuracy level, and producing a second set of the read results using a second read operation having a second accuracy level, finer than the first accuracy level.

In some embodiments, estimating the confidence levels includes assigning some of the output storage value a low confidence level, and compressing and transferring the confidence levels include indicating to the memory controller only the output storage values having the low confidence level. In a disclosed embodiment, the interface includes a parallel bus having a signaling line, transferring the output storage values includes sending one or more of the output storage values during each cycle of the bus, and indicating the storage values having the low confidence level includes signaling over the signaling line when at least one of the output storage values sent during a given cycle has the low confidence level. In another embodiment, the interface includes a parallel bus having a signaling line, indicating the storage values having the low confidence level includes sending the storage values having the low confidence level over the signaling line, and transferring the output storage values includes sending the output storage values over lines other than the signaling line.

There is additionally provided, in accordance with an embodiment, an apparatus for data storage, including:

a plurality of analog memory cells; and circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface to a memory controller.

There is also provided, in accordance with an embodiment, an apparatus for data storage, including:

a memory device, including:

a plurality of analog memory cells; and circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface; and a memory controller, which is configured to receive the output storage values and the compressed confidence levels over the interface, to decompress the transferred output storage values and to reconstruct the data responsively to the output storage values and the decompressed confidence levels.

The embodiments disclosed herein will be more fully understood from the following detailed description of the embodiments thereof, taken together with the drawings in which:

DETAILED DESCRIPTION OF EMBODIMENTS

Overview

Figure 1:
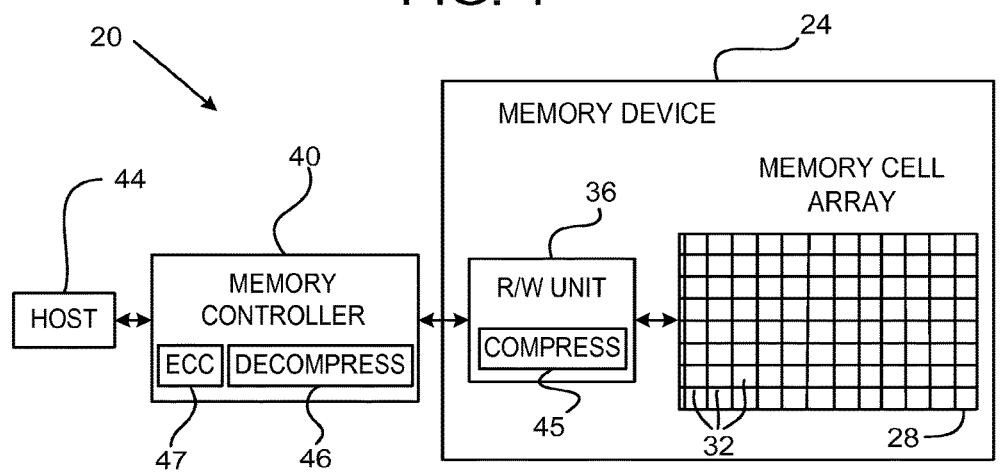
FIG. 1 is a block diagram that schematically illustrates a memory system, in accordance with an embodiment.

Data is typically stored in analog memory cells by writing respective storage values to the cells. The storage operation programs each memory cell to one of several programming states, which represent respective data values. Data that is stored in analog memory cells may have varying levels of confidence, i.e., different likelihoods that the data read from the memory cells truly reflects the data that was stored in the cells.

Typically, the storage values (e.g., threshold voltages) of the memory cells that are associated with a given programming state have a certain statistical distribution. When the storage value distributions of different programming states overlap, storage values that lie in boundary regions between adjacent programming states might cause read errors. Such storage values may be regarded as having low confidence levels. Storage values that lie in the middle of the distributions, on the other hand, are more likely to be reliable.

The performance of data readout from analog memory cells can be improved by considering the confidence levels of the different storage values. For example, in some data storage schemes, an Error Correction Code (ECC) unit encodes the data for storage with an ECC and decodes the ECC when retrieving the data. Some ECC decoders decode the ECC by operating on soft metrics. The confidence levels of the read storage values can be used to produce such soft metrics.

However, transferring the confidence levels from the memory cells to the ECC decoder typically adds a considerable amount of communication traffic between the two. A typical read operation retrieves data from thousands of memory cells simultaneously. Transferring the confidence levels assigned to these read results may require an exceedingly high communication rate. The high communication rate can be especially problematic when the memory cells and the ECC decoder reside in separate devices.

Embodiments that are described hereinbelow provide improved methods and systems for data readout from analog memory cells. The methods and systems described herein estimate the confidence levels of the storage values, and then compress the confidence levels before they are transferred. The compression of confidence levels is typically efficient, since most of the storage values tend to be reliable, and only a small fraction of the storage values have low confidence levels. In other words, confidence levels often exhibit little or no variability from one storage value to another, and therefore lend themselves to highly efficient compression. Upon arrival at the ECC decoder, the compressed confidence levels are decompressed and used for decoding the ECC.

In one embodiment, the storage values are read using a first set of read thresholds, and the confidence levels are estimated by re-reading the memory cells using a second, different set of read thresholds. The read thresholds in the second set are chosen so as to identify storage values that lie in the boundary regions between programming states. Several examples of compression schemes that can be used for compressing the confidence levels on this basis are described below.

In summary, by transferring compressed confidence levels, the disclosed methods and systems provide the performance benefits of soft ECC decoding while incurring only a small increase in communication traffic.

Typically, the decompressed confidence levels are processed to produce soft metrics of the storage values. The ECC decoder decodes the ECC by operating on the soft metrics. In some embodiments, the memory cells are re-read using different read thresholds, and the soft metrics are refined in an iterative manner until ECC decoding is successful.

System Description

FIG. 1 is a block diagram that schematically illustrates a memory system 20, in accordance with an embodiment. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 comprises a memory device 24, which stores data in a memory cell array 28. The memory cell array comprises multiple analog memory cells 32. In the context of the present patent application and in the claims, the term "analog memory cell" is used to describe any memory cell that holds a continuous, analog level of a physical quantity, such as an electrical voltage or charge. Array 28 may comprise analog memory cells of any kind, such as, for example, NAND, NOR and CTF Flash cells, PCM, NROM, FRAM, MRAM and DRAM cells. Memory cells 32 may comprise Single-Level Cells (SLC) or Multi-Level Cells (MLC, also referred to as multi-bit cells).

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming states are selected from a finite set of possible states, and each state corresponds to a certain nominal storage value. For example, a 2 bit/cell MLC can be programmed to assume one of four possible programming states by writing one of four possible nominal storage values to the cell.

Memory device 24 comprises a reading/writing (R/W) unit 36, which converts data for storage in the memory device to storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells 32 into digital samples having a resolution of one or more bits. The R/W unit typically reads data from cells 32 by comparing the storage values of the cells to one or more read thresholds. Data is typically written to and read from the memory cells in groups that are referred to as pages. In some embodiments, the R/W unit can erase a group of cells 32 by applying one or more negative erasure pulses to the cells.

The storage and retrieval of data in and out of memory device 24 is performed by a memory controller 40, which communicates with device 24 over a suitable interface. In some embodiments, controller 40 produces the storage values for storing in the memory cells and provides these values to R/W unit 36. Alternatively, controller 40 may provide the data for storage, and the conversion to storage values is carried out by the R/W unit internally to the memory device.

Memory controller 40 communicates with a host 44, for accepting data for storage in the memory device and for outputting data retrieved from the memory device. In some embodiments, some or even all of the functions of controller 40 may be implemented in hardware. Alternatively, controller 40 may comprise a microprocessor that runs suitable software, or a combination of hardware and software elements.

In some embodiments, R/W unit 36 comprises a compression module 45, which compresses some of the information that is to be sent to memory controller 40. The memory controller comprises a decompression module 46, which decompresses the compressed information received from memory device 24. In particular, R/W unit 36 may produce confidence levels of the storage values read from cells 32, and module 45 may compress these confidence levels and send them to controller 40. (In some embodiments, module 45 can also be used for compressing other types of information, such as stored data that is retrieved from cells 32.)

The memory controller uses the storage values read from cells 32, and the associated confidence levels, to reconstruct the stored data. For example, memory controller 40 may comprise an Error Correction Code (ECC) unit 47, which encodes the data for storage using a suitable ECC, and decodes the ECC of the data retrieved from memory cells 32. Unit 47 may apply any suitable type of ECC, such as, for example, a Low-Density Parity Check (LDPC) code or a Bose-Chaudhuri-Hocquenghem (BCH) code. In some embodiments, ECC unit 47 uses the confidence levels to improve the ECC decoding performance. Several example methods for obtaining and compressing confidence levels, as well as for using the confidence levels in ECC decoding, are described hereinbelow.

The configuration of FIG. 1 is an exemplary system configuration, which is shown purely for the sake of conceptual clarity. Any other suitable memory system configuration can also be used. Elements that are not necessary for understanding the principles of the embodiments, such as various interfaces, addressing circuits, timing and sequencing circuits and debugging circuits, have been omitted from the figure for clarity.

In the exemplary system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the circuitry of the memory controller may reside on the same die on which the memory array is disposed. Further alternatively, some or all of the functionality of controller 40 can be implemented in software and carried out by a processor or other element of the host system. In some embodiments, host 44 and memory controller 40 may be fabricated on the same die, or on separate dies in the same device package.

In some implementations, a single memory controller may be connected to multiple memory devices 24. In yet another embodiment, some or all of the memory controller functionality may be carried out by a separate unit, referred to as a memory extension, which acts as a slave of memory device 24. Typically, controller 40 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Memory cells 32 of array 28 are typically arranged in a grid having multiple rows and columns, commonly referred to as word lines and bit lines, respectively. The array is typically divided into multiple pages, i.e., groups of memory cells that are programmed and read simultaneously. Cells are typically erased in groups of word lines that are referred to as erasure blocks. In some embodiments, a given memory devices comprises multiple memory cell arrays, which may be fabricated on separate dies.

Compression of Confidence Level Information

The storage values stored in memory cells 32 often have varying confidence levels. In other words, when attempting to retrieve data from cells 32 by reading their storage values, different storage values may have different likelihoods of truly representing the data that was originally stored. The memory cells that are programmed to a given programming state typically have storage values that are distributed in accordance with a certain statistical distribution. The properties of the storage value distributions depend on various factors and impairments, such as inaccuracies in the programming process, interference from neighboring cells, aging effects and many others.

Within a given storage value distribution, some cells may have higher confidence levels (i.e., high likelihood of being read correctly) while other cells may have lower confidence levels (i.e., higher likelihood of causing read errors). For example, R/W unit 36 typically reads the cells by comparing their storage values to one or more read thresholds, which are positioned between adjacent programming states. Thus, a storage value located in a boundary region between adjacent programming states has a relatively high likelihood of falling on the wrong side of a read threshold and causing a read error. A storage value located in the middle of the distribution can usually be regarded as reliable.

In some embodiments, memory controller 40 uses estimates of these confidence levels to improve the performance of the data readout process. For example, in some embodiments ECC unit 47 decodes the ECC by operating on soft metrics, such as Log Likelihood Ratios (LLRs) of the read storage values or of individual bits represented by these storage values. As another example, some of the storage values that are regarded as unreliable or uncertain may be marked as erasures to the ECC unit. Estimated confidence levels of the read storage values can be used to mark certain storage values as erasures, and/or to produce soft metrics. Soft metrics, erasures and/or any other suitable metrics that assist the ECC unit in decoding the ECC are referred to herein as ECC metrics. Additionally or alternatively, the confidence levels can be used in any suitable way to reconstruct the stored data.

The confidence levels of the storage values can be estimated in various ways. In some embodiments, R/W unit 36 retrieves data from a group of memory cells 32 by comparing their storage values to one or more read thresholds. The R/W unit estimates the confidence levels of these storage values by re-reading the memory cells with a different set of read thresholds, which are positioned so as to identify storage values that are located in boundary regions between adjacent programming states. This technique is demonstrated in FIG. 2 below.

Figure 2:
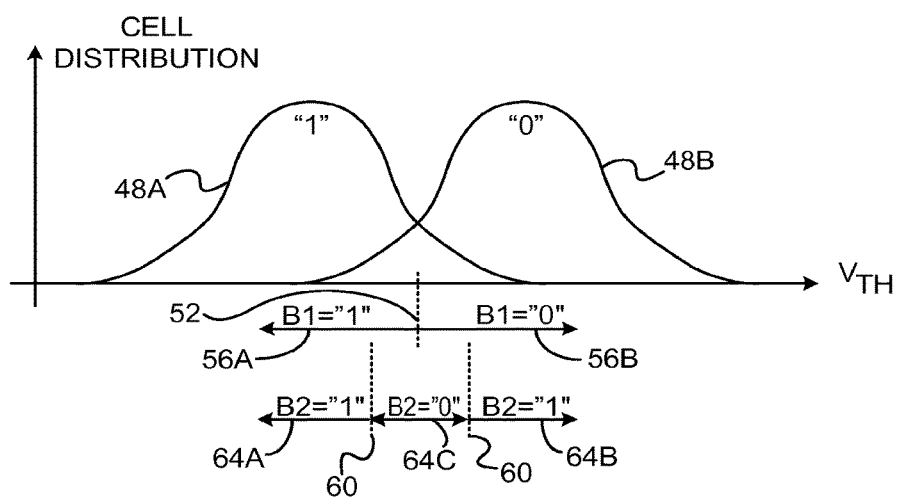
FIG. 2 is a graph showing storage value distributions in a group of analog memory cells, in accordance with an embodiment.

FIG. 2 is a graph showing storage value distributions in a group of analog memory cells 32, in accordance with an embodiment. In the present example, each memory cell 32 is programmed to one of two programming states, which represent stored data values of "1" and "0". Plots 48A and 48B show the distributions of the storage values (threshold voltages) associated with the "1" and "0" programming states, respectively.

In order to retrieve the data stored in the group of memory cells, R/W unit 36 reads the storage values of the cells by comparing them to a read threshold 52. The comparison results are denoted B1. Read threshold 52 is positioned between the two distributions, and divides the storage value axis into two regions 56A and 56B. Storage values falling below the threshold in region 56A are read as B1="1", and storage values falling above the threshold in region 56B are read as B1="0".

In practice, however, some of the storage values may fall on the wrong side of read threshold 52 and cause read errors. In the example of FIG. 2, distributions 48A and 48B overlap, meaning that some of the storage values associated with state "0" fall in region 56B above threshold 52, and some storage values associated with state "1" fall in region 56A below threshold 52.

In the present example, R/W unit 36 estimates the confidence levels of the storage values by re-reading the memory cells using two additional read thresholds 60. These two read thresholds are positioned slightly above and below threshold 52, and divide the storage value axis into three regions 64A, 64B and 64C. The results of the re-reading operation are denoted B2. Storage values falling in regions 64A and 64B, i.e., below the low threshold or above the high threshold, are assigned B2="1". Storage values falling in region 64C, i.e., between read thresholds 60, are assigned B2="0".

As can be seen in the figure, storage values in regions 64A and 64B are relatively far from the boundary region between distributions 48A and 48B, and are therefore likely to be read correctly by read threshold 52. Storage values falling in region 64B, on the other hand, have a relatively high likelihood of causing read errors when read using read threshold 52.

If a given storage value is assigned B2="1", then the B1 data value read using threshold 52 (which may be B1="0" or B1="1") has a high confidence level. A storage value that is assigned B2="0" has a low confidence level, indicating that the B1 data value read using threshold 52 has a relatively high likelihood of being erroneous. In other words, B2 forms an estimate of the confidence level of the storage values read using threshold 52.

As noted above, ECC unit 47 in memory controller 40 decodes the ECC based on the estimated confidence levels of the read storage values. In order to provide this information to ECC unit 47, R/W unit 36 transfers the estimated confidence levels from memory device 24 to memory controller 40 over the interface that connects the two devices. As can be appreciated, the additional communication volume created by transferring the estimated confidence levels is high and may be unfeasible.

In order to reduce the communication volume between the memory device and the memory controller (or otherwise between the memory cells and the ECC decoder), R/W unit 36 compresses the estimated confidence levels before transferring them to the memory controller. The term "compression" in this context typically means any process that reduces the communication rate or bandwidth that is used for transferring the estimated confidence levels. Compression may be lossless (i.e., required to maintain the original confidence level values without error) or lossy (i.e., allowed a certain error probability due to the compression and decompression process).

In most practical cases, the estimated confidence levels lend themselves to efficient compression, since they exhibit little or no variation from one cell to another. Most compression schemes achieve high compression ratios when operating on data having little variability. In FIG. 2, for example, it can be seen that the vast majority of the storage values have an estimated confidence level of B2="1". Only a small fraction of the storage values fall in region 64B and are assigned B2="0". Thus, a set or sequence of B2 values can typically be compressed with high efficiency. Such a situation is typical of confidence levels, since data storage systems are usually designed to perform at low error probabilities.

R/W unit 36 may compress the estimated confidence levels using any suitable compression scheme. For example, instead of transferring a sequence of estimated confidence levels, the R/W unit may transfer the run lengths of the sequence, i.e., the numbers of successive "0" and "1" runs in the sequence. This compression scheme is commonly known as run-length coding.

The description above refers to 1-bit confidence levels, i.e., to configurations in which each storage value or read data value (B1 value) has a single estimated confidence level (B2 value). In alternative embodiments, however, this scheme can be generalized to multi-bit confidence levels. For example, two or more intervals of different sizes can be defined around read threshold 52, and each storage value can be assigned a confidence level having two or more bits, depending on the interval in which it falls. In other words, each storage value can be assigned a multi-bit confidence level, which is indicative of the distance of the storage value from read threshold 52. Storage values that are further away from the read threshold are assigned high confidence levels, and vice versa.

In some embodiments, the interface between the memory device and the memory controller comprises a parallel bus interface, e.g., an eight-bit bus. In each bus cycle, an 8-bit word comprising eight read data values is transferred over the bus from device 24 to controller 40. In the present example, the R/W unit transfers eight B1 values in each bus cycle.

In one embodiment, an additional line denoted SoftIndication is added to the bus interface. In each bus cycle, the SoftIndication line is set to the logical AND of all the estimated confidence levels (B2 values) of the data values transferred in this cycle. In most cycles, the data (B1) values have high confidence levels (B2="1"), and therefore the SoftIndication line will be "1". In the relatively rare occasion that one or more of the B1 values in the cycle have a low confidence level (B2="0"), the SoftIndication line in that cycle is set to "0". When the SoftIndication line is "0" in a given cycle, the next bus cycle is used for sending an indication as to which of the B1 values sent in the previous cycle had the low confidence level. The following table demonstrates this process:

| Bus cycle # | SoftIndication | Information on bus |
|---|---|---|
| . . . | . . . | . . . |
| . . . | . . . | . . . |
| M | "1" | VAL (N) |
| M + 1 | "1" | VAL (N + 1) |
| M + 2 | "0" | VAL (N + 2) |
| M + 3 | "0" | IND (VAL (N + 2)) |
| M + 4 | "1" | VAL (N + 3) |
| . . . | . . . | . . . |
| . . . | . . . | . . . |
| . . . | . . . | . . . |

During bus cycles M . . . M+2, the bus transfers words containing read data values (B1 values) denoted VAL(N) . . . VAL(N+2), respectively. In words VAL(N) and VAL(N+1), all data values have high confidence levels (B2="1"), and therefore the SoftIndication line during cycles M and M+1 is "1". In word VAL(N+2), on the other hand, one or more of the data values has a low confidence level. Therefore, the SoftIndication line is "0" in cycle M+2. In the following cycle (cycle M+3) the R/W unit sends a word denoted IND(VAL(N+2)), which indicates which of the data values sent in cycle M+2 has a low confidence level. The SoftIndication line is kept at "0" during cycle M+3, as well. In cycle M+4 all the data values have high confidence levels again, and the SoftIndication line returns to "1".

Using this technique, bus cycles are initially used only for transferring the data values. Bus cycles are not added and confidence level information is not transferred as long as the transferred data values have high confidence levels. A bus cycle is added only when one or more data values transferred in a given bus cycle have low confidence level. In a typical implementation, only a small fraction of the transferred words (typically less than 10%) contain data values having low confidence levels. Therefore, the transferring of confidence level information incurs only a small increase in communication volume. Nevertheless, this compression scheme is lossless, i.e., the memory controller is provided with the correct confidence level indication for each transferred data value.

Alternatively, the memory device may transfer the data values (B1 values) over the eight-bit bus, and transfer the compressed confidence levels (compressed B2 values) over the additional SoftIndication line. This scheme assumes that, on average, the rate of the compressed B2 values is at least eight times lower than the rate of the B1 values. In other words, this scheme assumes an average compression ratio of eight or more.

Alternatively to adding a dedicated SoftIndication line, the memory device and memory controller can use one of the existing lines in the interface for this purpose. For example, a Ready/Busy (R/B) line, which often already exists in bus interfaces, can be used. This scheme is beneficial since it avoids adding an additional line to the interface.

In another alternative embodiment, compression module 46 compresses the confidence levels (B2 values) for a set of storage values using any suitable compression scheme. The R/W unit transfers the data values (B1 values) followed by the compressed confidence levels (compressed B2 values). The following table demonstrates this scheme in data readout from a memory page having 8·N data values (e.g., 8·4224=33792 data values per page):

| Bus cycle # | Information on bus |
|---|---|
| 1 | VAL (1) |
| 2 | VAL (2) |
| ... | ... |
| N = 4224 | VAL (N) |
| N + 1 | COMP (1) |
| N + 2 | COMP (2) |
| ... | ... |
| N + M | COMP (M) |

In the present example, the confidence levels of the 8·N data values (N bytes) are compressed to produce 8·M bits (M bytes), M<N. The M bytes are transferred using M bus cycles. In this example, the compression may be either lossless or lossy. In many practical cases, ECC unit 47 is able to decode the ECC successfully even when it operates on confidence levels that were compressed using lossy compression.

In some embodiments, the memory controller may initially read only K out of the M bytes that carry the compressed confidence levels (K<M). In these embodiments, ECC unit 47 initially attempts to decode the ECC using the compressed confidence levels carried in the K bytes. The memory controller reads the additional M-K bytes only if the initial ECC decoding attempt fails. This scheme may reduce the average ECC decoding time, since in many cases the ECC can be decoded successfully using only a subset of the confidence levels.

Figure 3:
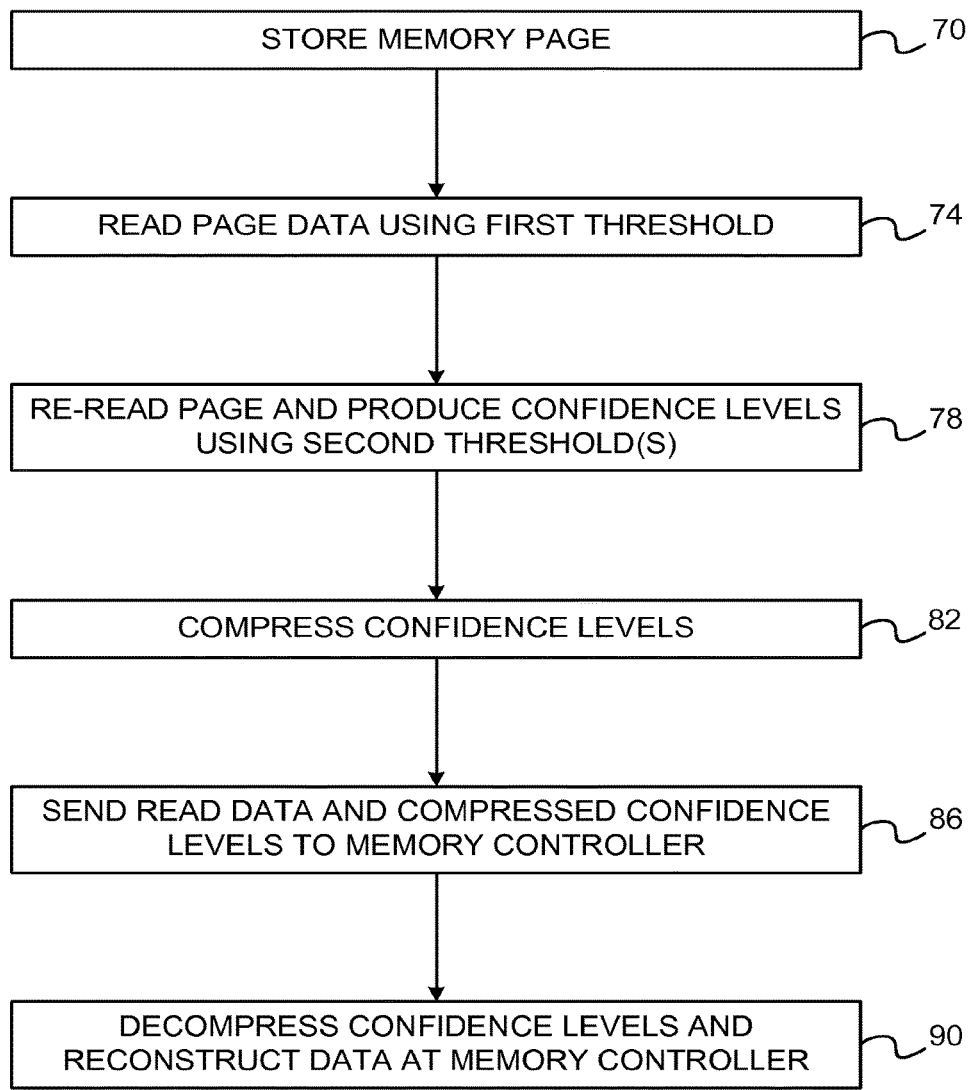
FIGS. 3 and 4 are flow charts that schematically illustrate methods for data readout from analog memory cells, in accordance with embodiments.

FIG. 3 is a flow chart that schematically illustrates a method for data readout from analog memory cells 32, in accordance with an embodiment. The method begins with memory controller 40 storing a page of data in memory device 24, at a storage step 70. ECC unit 47 in controller 40 encodes the data with an ECC, and the encoded data is transferred to the memory device. In device 24, R/W unit 36 writes storage values representing the encoded data into a group of memory cells 32.

At a later point in time, the memory controller requests the memory device to retrieve the data page in question. In response to the request, R/W unit 36 reads the page, at a reading step 74. The R/W unit reads the page by comparing the storage values of the memory cells in the group to read threshold 52 (see FIG. 2). The comparison results produce the B1 data values shown in FIG. 2. The R/W unit re-reads the page to produce respective estimated confidence levels of the storage values, at a re-reading step 78. The R/W unit re-reads the page using read thresholds 60, to produce the B2 value shown in FIG. 2.

Compression module 45 in R/W unit 36 compresses the estimated confidence levels, at a compression step 82. Any suitable compression scheme, such as the example compression schemes described above, can be used. The R/W unit transfers the read data values and the compressed confidence levels to the memory controller, at a transfer step 86. In memory controller 40, decompression module 46 decompresses the compressed confidence levels received over the interface from the memory device, and reconstructs the data page, at a reconstruction step 90. In particular, ECC unit 47 decodes the ECC of the page using the decompressed confidence levels.

Iterative Refinement of Soft ECC Metrics

As noted above, memory controller 40 may decode the ECC by operating on soft metrics (e.g., LLRs), which are computed based on the confidence levels transferred from the memory device. In some embodiments, the memory controller refines the soft metrics in an iterative manner by obtaining additional confidence level information regarding the storage values of the memory cells. In some embodiments, the memory controller initially attempts to decode the ECC based on the read data values (i.e., using hard metrics), and refines the metrics iteratively until the ECC is decoded successfully.

Figure 4:
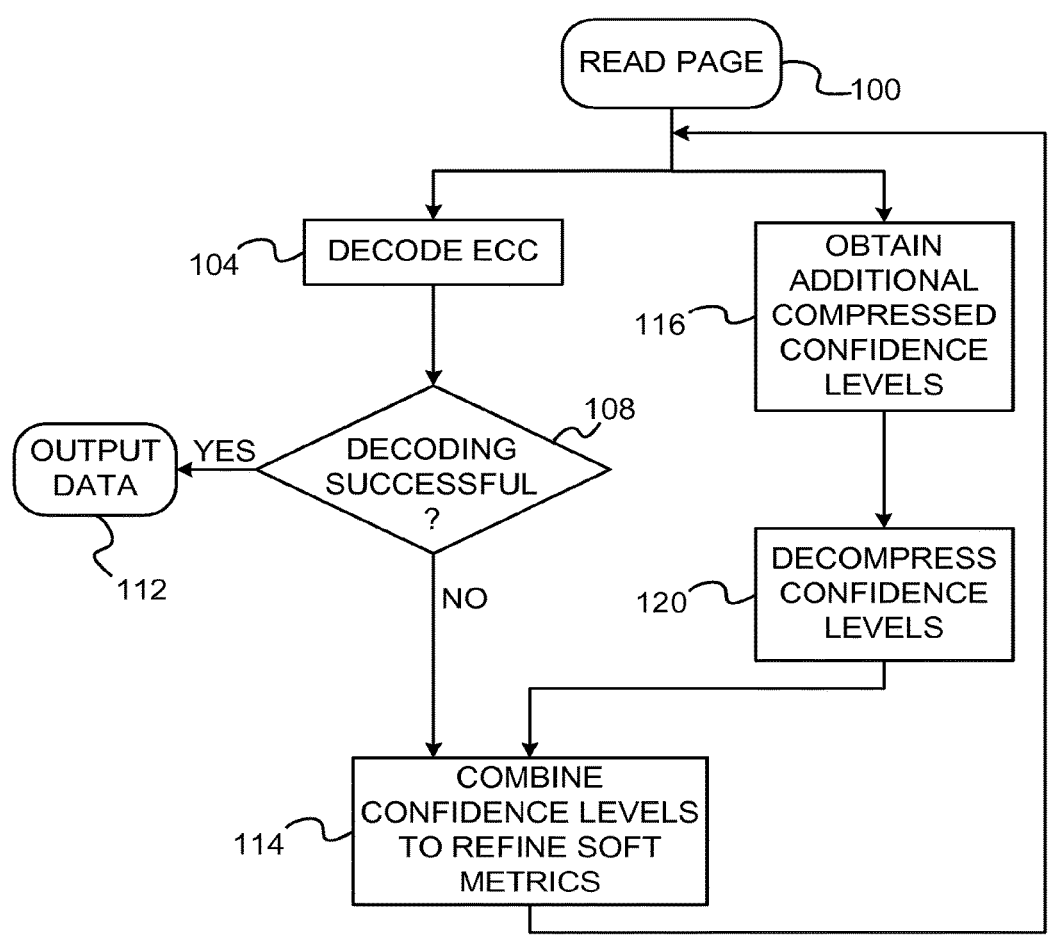

FIG. 4 is a flow chart that schematically illustrates an iterative process for data readout from memory cells 32, in accordance with an embodiment. The method begins with memory controller 40 reading the data values of a certain memory page, at a page readout step 100. ECC unit 47 attempts to decode the ECC, at a decoding step 104. The ECC unit decodes the ECC using soft metrics, which are further refined in each iteration. In the first iteration, the metrics comprise the read data values, i.e., hard metrics.

Controller 40 checks whether the ECC is decoded successfully, at a checking step 108. If successful, the memory controller outputs the retrieved data page, and the method terminates, at a termination step 112. If, on the other hand, the ECC decoding attempt failed, the memory controller refines the soft metrics based on additional confidence level information regarding the read storage values, at a refinement step 114.

The additional confidence level information is obtained from memory device 24 concurrently with the ECC decoding attempt. The refined information may comprise, for example, an additional confidence level bit for each storage value. In each iteration, the additional confidence level information is typically obtained by re-reading the page using one or more read thresholds, which are different from the thresholds used in previous iterations.

Examples of schemes for obtaining multi-bit confidence levels are described above. Additional aspects of reading analog memory cells using multiple read thresholds, and of iteratively refining confidence level information and soft metrics, are addressed in PCT International Publications WO 2007/132457, WO 2008/053472, WO 2008/111058 and WO 2008/139441, whose disclosures are incorporated herein by reference. R/W unit 36 in memory device 24 obtains and compresses the additional confidence level information, at a re-reading and compression step 116.

Memory controller 40 decompresses the additional confidence level information, at an additional decompression step 120. The memory controller then combines the confidence level information obtained in the current iteration with the previously-existing confidence level information, at a combining step 114. The new and existing confidence level information is combined so as to refine the soft metrics of the storage values. The method then loops back to step 100 above, in which ECC module 47 attempts to decode the ECC using the refined soft metrics.

When compressing the confidence level information in a given iteration of the method of FIG. 4, the R/W unit may obtain and provide refined confidence level information only for storage values that were identified in previous iterations as having low confidence levels. This technique further reduces the volume of confidence level information transferred to the memory controller. Techniques of this sort are addressed, for example, in U.S. Provisional Patent Applications 61/052,276 and 61/053,031, cited above.

In some embodiments, the memory controller may apply different policies regarding refinement the confidence levels at different stages of the memory device's life cycle. At the beginning of the memory device's life cycle, the distortion in memory cells 32 is relatively low, and ECC decoding using hard metrics is likely to succeed. Toward end-of-life, on the other hand, the distortion level in cells 32 grows, so that hard decoding may be unlikely to succeed. Thus, in some embodiments, the memory device initially begins to operate using the method of FIG. 4 above. At a certain point in time, the memory device may switch to a different mode of operation, in which it requests the memory device to produce soft metrics to begin with, without initially attempting hard decoding.

In some of the above-mentioned methods, a certain memory cell is read using multiple different read thresholds. It is typically desirable to reduce the sense time involved in these multiple reading operation. A possible technique for rapidly reading a given memory cell multiple times using multiple read thresholds is described in PCT International Publication WO 2008/053473, whose disclosure is incorporated herein by reference.

In the description above, the confidence levels are obtained by re-reading the memory cells using different read thresholds. In alternative embodiments, however, the memory device may determine the confidence levels of the storage values using any other suitable method. All of the techniques described below can be carried out as part of the method of FIG. 3 above, or as part of the iterative method of FIG. 4 above. When carrying out the method of FIG. 4, calculation of the refined confidence level information can be performed either after or in semi-parallel with transferring the initial read results and decoding the ECC.

For example, the memory device may initially read the memory cells using a relatively fast read operation, which has a certain accuracy level (e.g., a read operation having a short sense time). The memory device can re-read the memory cells using a slower but more accurate read operation (e.g., by using a longer sense time). The results of the first and second read operations will typically differ in only a small number of cells. Therefore, the differences between the respective read results of the two read operations can be regarded as confidence levels and sent to the controller using any of the methods described herein. In some embodiments, the second read operation is invoked only when the memory controller fails to decode the ECC based on the results of the first read operation. This technique may be particularly suitable for memory devices in which the busy period of the read operation is long.

As another example, the memory device may re-read the memory cells several times (e.g., three times) using the same read thresholds and determine the confidence levels from the multiple read results, e.g., by performing a majority vote. This scheme can be applied iteratively. For example, the memory device can read the memory cells once and transfer the results to the memory controller. Then, the memory device can re-read the memory cells twice more, perform a majority vote and regard any corrections (i.e., discrepancies between the initial read results and the results of the majority vote) as low confidence levels that are to be transferred to the memory controller. As noted above, the additional read operations may be invoked conditionally—upon failure to decode the ECC based on the initial read results.

Although the embodiments described herein mainly address Single-Level Cells (SLC), in which each memory cell stores a single data bit by using two programming states, the principles of the embodiments can also be used in Multi-Level Cells (MLC), in which each memory cells stores two or more bits using multiple programming states.

It will thus be appreciated that the embodiments described above are cited by way of example, and that the embodiments are not limited to what has been particularly shown and described hereinabove. Rather, the scope of the embodiments includes both combinations and sub-combinations of the various features described hereinabove, as well as variations and modifications thereof which would occur to persons skilled in the art upon reading the foregoing description and which are not disclosed in the prior art.

The invention claimed is:

1. An apparatus, comprising:
   a memory controller;
   a plurality of memory cells; and
   a circuit configured to:
      read a plurality of values from a subset of the plurality of memory cells using a threshold value, wherein a particular value of the plurality of values is indicative of data stored in a particular memory cell of the subset of the plurality of memory cells;
      determine a plurality of multi-bit confidence levels using the plurality of values, wherein a particular multi-bit confidence level of the plurality of multi-bit confidence levels is indicative of a difference between a particular value and the threshold value; and
      transfer the plurality of multi-bit confidence levels to the memory controller,
      wherein the memory controller is configured to reconstruct the data stored in the particular memory cell of the subset of the plurality of memory cells using the multi-bit confidence levels.

2. The apparatus of claim 1, wherein to transfer the plurality of multi-bit confidence levels to the memory controller, the circuit is further configured to generate a plurality of compressed confidence levels using the plurality of multi-bit confidence levels.

3. The apparatus of claim 2, wherein to generate the plurality of compressed confidence levels, the circuit is further configured to run-length encode the plurality of multi-bit confidence levels.

4. The apparatus of claim 2, wherein to generate the plurality of compressed confidence levels, the circuit is further configured to combine each confidence level of the plurality of multi-bit confidence levels using a logical-AND operation to generate an indicator value.

5. The apparatus of claim 4, wherein the circuit is coupled to the memory controller via a data bus, and wherein the circuit is further configured to send the indicator value to the memory controller using at least one wire separate from the data bus.

6. The apparatus of claim 1, wherein each memory cell of the plurality of memory cells includes a non-volatile memory cell.

7. A method, comprising:
reading, by a circuit, a plurality of values from a subset of a plurality of memory cells using a threshold value, wherein a particular value of the plurality of values is indicative of data stored in a particular memory cell of the subset of the plurality of memory cells;
determining, by the circuit, a plurality of multi-bit confidence levels using the plurality of values, wherein a particular multi-bit confidence level of the plurality of multi-bit confidence levels is indicative of a difference between a particular value and the threshold value;
transferring, by the circuit, the plurality of multi-bit confidence levels to a controller; and
reconstructing, by the controller, the data stored in the particular memory cell of the subset of the plurality of memory cells using the plurality of multi-bit confidence levels.

8. The method of claim 7, wherein transferring, by the circuit, the plurality of multi-bit confidence levels to the controller includes generating, by the circuit, a plurality of compressed confidence levels using the plurality of multi-bit confidence levels.

9. The method of claim 8, wherein generating the plurality of compressed confidence levels includes run-length encoding the plurality of multi-bit confidence levels.

10. The method of claim 8, wherein generating the plurality of compressed confidence levels includes generating, by the circuit, an indicator value by combining each confidence level of the plurality of multi-bit confidence levels using a logical-AND.

11. The method of claim 10, further comprising, transferring the plurality of values to the controller via a data bus.

12. The method of claim 11, further comprising sending, by the circuit, the indicator value to the controller using at least one wire separate from the data bus.

13. The method of claim 7, wherein each memory cell of the plurality of memory cells includes a non-volatile memory cell.

14. A system, comprising:
a memory controller; and
a memory coupled to the memory controller via a data bus, wherein the memory includes a plurality of memory cells, and wherein the memory is configured to:
read a plurality of values from a subset of the plurality of memory cells using a threshold value, wherein a particular value of the plurality of values is indicative of data stored in a particular memory cell of the subset of the plurality of memory cells;
determine a plurality of multi-bit confidence levels using the plurality of values, wherein a particular multi-bit confidence level of the plurality of multi-bit confidence levels is indicative of a difference between a particular value and the threshold value; and
transfer the plurality of multi-bit confidence levels to the memory controller.

15. The system of claim 14, wherein to transfer the plurality of multi-bit confidence levels to the memory controller, the memory is further configured to generate a plurality of compressed confidence levels using the plurality of multi-bit confidence levels.

16. The system of claim 15, wherein to generate the plurality of compressed confidence levels, the memory is further configured to run-length encode the plurality of multi-bit confidence levels.

17. The system of claim 15, wherein to generate the plurality of compressed confidence levels, the memory is further configured to combine each confidence level of the plurality of multi-bit confidence levels using a logical-AND operation to generate an indicator value.

18. The system of claim 17, wherein the memory is coupled to the memory controller via a data bus, and wherein the memory is further configured to transfer the plurality of values to the memory controller via the data bus.

19. The system of claim 18, wherein the memory is further configured to send the indicator value to the memory controller using at least one wire separate from the data bus.

20. The system of claim 14, wherein each memory cell of the plurality of memory cells includes a non-volatile memory cell.

* * * * *